United States Patent [19]

Santén

[11] Patent Number: 4,635,573
[45] Date of Patent: Jan. 13, 1987

[54] METHOD FOR DESTROYING REFUSE

[75] Inventor: Sven Santén, Hofors, Sweden

[73] Assignee: SKF Steel Engineering AB, Hofors, Sweden

[21] Appl. No.: 703,096

[22] Filed: Apr. 5, 1985

Related U.S. Application Data

[63] Continuation of Ser. No. 542,343, Nov. 17, 1983, abandoned.

[30] Foreign Application Priority Data

Mar. 23, 1983 [SE] Sweden .............. 8301592
Sep. 6, 1983 [SE] Sweden .............. 8304770

[51] Int. Cl.$^4$ ........................ F23G 5/00
[52] U.S. Cl. ........................ 110/346; 110/244; 110/254; 110/256; 110/302
[58] Field of Search ............ 110/218, 219, 224, 229, 110/230, 235, 243, 244, 250, 254–257, 302–304, 315, 316, 342, 343, 346, 348; 431/208

[56] References Cited

U.S. PATENT DOCUMENTS

| | | | |
|---|---|---|---|
| 3,697,256 | 10/1972 | Engle | 110/346 |
| 3,766,866 | 10/1973 | Krumm | 110/255 |
| 3,976,018 | 8/1976 | Boulet | 110/254 X |
| 4,092,935 | 6/1978 | Barnabe | 110/304 |
| 4,109,590 | 8/1978 | Mansfield | 110/254 X |
| 4,159,684 | 7/1979 | Kirkup | 110/346 |
| 4,210,087 | 7/1980 | Melan et al. | 110/256 |
| 4,306,506 | 12/1981 | Rotter | 110/256 |
| 4,321,877 | 3/1982 | Schmidt et al. | 110/255 |
| 4,346,661 | 8/1982 | Nakamura | 110/235 |
| 4,361,100 | 11/1982 | Hinser | 110/346 |

FOREIGN PATENT DOCUMENTS 8200509 2/1982 PCT Int'l Appl. .............. 110/346

Primary Examiner—Albert J. Makay
Assistant Examiner—Steven E. Warner
Attorney, Agent, or Firm—Armstrong, Nikaido, Marmelstein & Kubovcik

[57] ABSTRACT

The invention relates to a method of destroying and vaporizing refuse, primarily household waste. The material is fed into a shaft furnace, in which the material is subjected to a vaporization and combustion process in at least three zones, said zones being produced by the supply of blast air at least at three different levels in the shaft furnace which blast gas completely or partly is supplied with controlled quantities of thermal energy by means of electricity, preferably by using at least one plasma generator. The gas produced by the process is withdrawn through an annular drum, arranged about two thirds of the way up the shaft furnace. The gas leaving can be used as combustion gas e.g. for district heating plants and steam power stations with varying thermal requirements.

11 Claims, 1 Drawing Figure

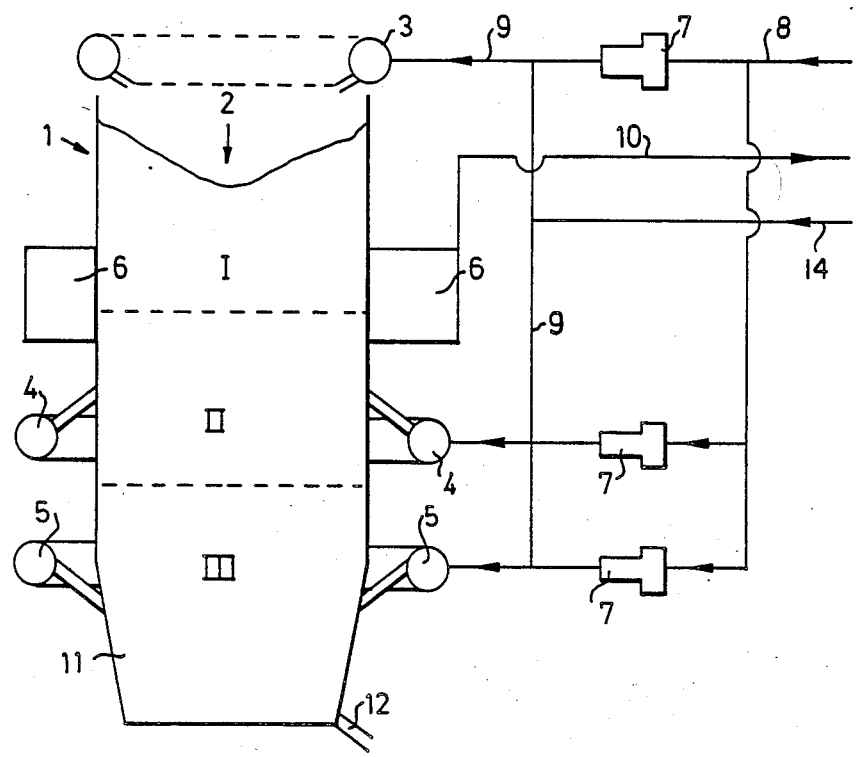

METHOD FOR DESTROYING REFUSE

This is a continuation of application Ser. No. 542,343, filed Nov. 17, 1983, now abandoned.

The present invention relates to a method of destroying and vaporizing refuse, primarily household waste, the material being fed into the top of a shaft furnace through a gas-tight discharger.

The problem of vaporizing refuse according to known methods is that the temperature in the final vaporization step, as well as in the product gas produced in the reactor, is too low. This is partly because refuse has a low heat content and a high water content.

Such low vaporization temperatures cause several disadvantages, such as the incomplete breakdown of hydrocarbon compounds, which gives rise to problematical "tar formation" in the gas system, and to constituents which cannot be vaporized being fed out as a solid ash in which the constituents are dissolved or not bound, thus giving rise to deposition problems because of dust formation and because damaging substances can easily be leached out of the ash.

One object of the present invention is to eliminate the drawbacks mentioned above and to provide a process which is substantially independent of the water content and the composition of the incoming material.

Another object of the invention is to effect a process which consumes less energy than previously used processes and which also results in a valuable process gas.

Accordingly the present invention provides a method of destroying and vaporizing material, comprising pre-drying and pre-vaporizing the material while flowing together with process gas; then feeding the refuse into the top of a shaft furnace through a gas-tight discharger; and supplying in addition to the thermal energy generated during the combustion, an additional controlled quantity of thermal energy by means of blast gas completely or partly electrically heated.

The heating of the blast gas may be performed by means of plasma generators, electrical resistor elements and/or indirectly in heat exchangers.

However, preferably at least one plasma generator is used in the method. In this way the gas may be supplied with an extremely high quantity of energy per unit volume, thereby enabling the vaporization and slagging temperatures to be controlled extremely accurately.

The heating of blast gas with the aid of plasma generators can be performed in different ways. Thus, all or a part of the blast gas can be passed through the plasma generator. Further, a variable but controlled portion of the blast gas can be added downstream of the plasma generator to the rest of the blast gas stream which has by then been heated by the plasma generator.

Normally, air is used as blast gas. However, under normal conditions it is essential to minimize the risk of nitrogen dioxide formation and this might be achieved by heating steam in the plasma generator. The thus heated steam then is used to heat the main gas stream. Other gases might also be admixed, for example different hydrocarbons, recirculated process gas etc.

Optionally, solid fuels such as coal, rubber waste and/or waste oil are mixed into the incoming material, whereby the thermal value of the product gas can be controlled.

Preferably the extra thermal energy is supplied at several different levels in the shaft furnace. This, together with the use of at least one plasma generator to accomplish the heating, enables the temperatures in the various stages of the process to be controlled quickly and with great accuracy, irrespective of the thermal value and water content of the incoming material.

Providing extra thermal energy by means of preheated process gas introduced ahead of the charging level at the top of the shaft furnace results in the incoming material being pre-dried and vaporized while flowing along with the process gas. One of the advantages of this is that most of the water content does not need to be broken down and a small quantity of the carbon entering can be oxidized to carbon dioxide without obtaining too low a temperature in the gas leaving. This removal of water and oxidation of some of the carbon considerably reduces the need for extra thermal energy.

Further characteristics and advantages of the method according to the present invention will be revealed in the following detailed description of the process with reference to the accompanying drawing in which the sole FIGURE shows schematically a means for performing the method according to the present invention.

The FIGURE thus shows schematically an installation for performing the process according to the present invention, the shaft furnace in which refuse destruction takes place being designated 1.

The incoming material in the form of refuse, primarily household waste, optionally with solid fuel such as pit coal and rubber waste mixed in, is fed in at the top 2 of the shaft furnace through a gastight discharger, not shown in detail.

The shaft furnace 1 is provided with supply means for blast air at three different levels, namely at 3 above the charging level, at 4 in the mid-region of the shaft, and at 5 at the bottom 11 of the shaft. An annular drum 6 is also arranged about two thirds of the way up the shaft through which product gas can leave the furnace.

Plasma generators 7 are arranged to heat the blast air. The blast air is supplied to the shaft furnace through pipes 9 and the product gas leaves the annular drum 6 through the pipe 10. Various heat-exchanger units may be arranged to pre-heat the blast air before it is caused to pass the plasma generators, using the heat in the gas leaving the furnace. However, these have been omitted in order not to complicate the drawing unnecessarily, particularly as their location and construction is of no decisive significance to the inventive concept.

One embodiment of the method according to the invention will now be described in detail. It should be noted, however, that the data stated can be varied and modified without going outside the scope of the invention as defined by the claims.

The incoming material is thus fed in through the gastight discharger mentioned earlier, and its temperature gradually increases as the material falls down through the shaft. At the bottom 11 of the shaft, non-combustible substances are converted to a liquid slag which is removed through a slag outlet 12. The product gas is removed via the annular drum 6 which, as indicated above, is arranged about two thirds of the way up the shaft. Blast air pre-heated to about 400° C. by means of heat-exchange with product gas leaving the drum 6, is heated by the plasma generator 7 to about 800° C. and then blown through the air supply means 3 above the charging surface 4 immediately above or below the annular ring 6 for the removal of gas, and 5 in the bottom part of the shaft. These three flows of blast air can be controlled independently of each other, with respect to both temperature and quantity. Where it is desired to heat the main gas stream with steam, steam is introduced into the plasma generators 7 through line 8. The main gas stream flows in through line 14 and joins the heated steam downstream of generators 7.

The process can be divided into three stages, designated I, II and III, which take place in different zones of the shaft furnace, the approximate limits of these zones being indicated by broken lines in the drawing. The process is in no way limited to three zones; four zones or more can be used.

In zone I the water content in the incoming material is evaporated and initial vaporization and carbonization of the material occurs as well as partial combustion. Since the final temperature is as low as about 600° C., the hydrogen and oxygen in the water will not noticeably dissociate and vaporized material will to a great extent be combusted to carbon dioxide and water. Admittedly this reduces the thermal value in the product gas, but it also considerably reduces the heat requirement in the continued vaporization process. The water vapour in the gas from zone I also assists in breaking down incompletely broken down hydrocarbons from zone II.

Since the composition, particle size, and water content in the incoming material varies considerably, it is impossible to specify any exact values for the reaction process in zone I. It is therefore essential that the installation is over-dimensioned with respect to the expected quantity of incoming material, particularly with respect to temperature and quantity of blast air supplied. The process in zone I can be controlled by means of the temperature of the leaving gas.

The following approximate data give an idea of what occurs in zone I:
- 80% water entering is evaporated
- 30% volatile portion of refuse is vaporized
- 30% volatile carbon portion is vaporized
- 10% bound carbon is vaporized
  - the ratio $CO_2/CO$ is 2:1 and the ratio $H_2O/H_2$ is 3:1 in the gas leaving
  - the temperature of the gas leaving is about 600° C.

In zone II the temperature of the material increases from 600° C. to about 1400° C. while the temperature of the gas leaving zone II is about 1200° C. The volatile portion of the refuse, coal and rubber is substantially fully vaporized in zone II. The heat requirement in zone II is covered by the hot gas from zone III, whereas there is a certain oxygen deficiency. Extra blast air must therefore be supplied to zone II to achieve complete break down of the vaporized hydrocarbons. At the transition between zones I and II, the hot gas from zone II is mixed with somewhat cooler gas from zone I so that the temperature of the gas flowing out to the annular drum 6 is about 1000° C. This relatively high temperature, together with the water vapor in the gas from zone I, results in any remaining hydrocarbons being rapidly broken down.

The process taking place in zone II is controlled with the aid of temperature and oxygen potential in the gas leaving.

In zone III the temperature rises about 1200° C. to about 1500° C. Only carbonized and inert material enter zone III and the products leaving zone III are therefore carbon monoxide and liquid slag. The heat requirement in this zone is partly met by the combustion heat of oxidation of the carbon to carbon monoxide and also partly by heated blast air. Since the final vaporization temperature is kept as high as 1500° C., all material which cannot be vaporized will be converted to slag and can be tapped off in the form of liquid slag in which all the constituents are firmly bound in a glasslike slag phase, thus considerably facilitating riskfree dumping. The process in zone III is controlled primarily by the slag temperature.

Mixing solid fuel into the refuse material before it is subjected to the vaporization process according to the invention offers a number of advantages. It increases the thermal value of the material, thus reducing the need for externally supplied thermal energy. It also loosens up the material charged, making it more uniform. By controlling the quantity or proportion of further added fuel it is also possible to control the heat volume produced in the gas within wide limits, thus following variations in the need for thermal energy of the prospective consumer.

The addition of solid fuel to a refuse destroyer operating in accordance with the method of the invention makes it a valuable supplier of gas, for example for district heating plants and steam power stations with varying thermal requirements.

The most salient advantages of the process can be summarized as follows:
- Vaporization occurs at high temperature, which results in a pure gas and prevents the formation of tar and unpleasant-smelling substances.
- Substances which cannot be vaporized are bound in a liquid slag which solidifies upon cooling, making the product odourless, facilitating dumping and preventing heavy metals, for instance, from being leached out.
- The heat content in the product gas can be controlled by the addition of solid fuels.

I claim:
1. A method of destroying and vaporizing household waste material, in which the material is fed into the top of a shaft furnace through a feeder and descends through at least three reaction zones, comprising the steps of
   (a) feeding the material concurrently with a first blast of hot process gas into the top of said furnace to predry, prevaporize, and partially combust said material in a first, upper zone and produce a first product gas which flows downwardly in said furnace,
   (b) subjecting said partially combusted material descending through the furnace to a second blast of hot process gas in a second intermediate zone to dry and vaporize volatile components of said material and produce a second product gas which flows upwardly in said furnace,
   (c) combining said first product gas and said second product gas and removing said combined gases from said furnace at a level within said furnace between the first and second zones,
   (d) subjecting said material as it continues to descend through the furnace to a third blast of hot process gas in a third lower zone to combust remaining carbon and melt noncombustible material,
   each of said hot blasts of process gas supplementing the heat of combustion for maintaining the reactions within the three furnace zones, and the flow rate and the temperatures of the three different process gas blast flows being controlled independently of each other by heating a predetermining quantity of said process gas in at least one plasma generator.

2. A method according to claim 1, wherein the process gas is air or air mixed with steam and/or products of combustion.

3. A method according to claim 1, wherein steam is heated in the plasma generator in order to subsequently heat the blast process gas.

4. The method of claim 1 in which the temperature of the product gas leaving said first zone is maintained at approximately 600° C., the temperature of the product gas leaving said second zone is maintained at approximately 1200° C., and in which the temperature of the slag in said third zone is maintained at approximately 1500° C.

5. A method according to claim 1, wherein the blast process gas supplied is pre-heated by heat-exchange with withdrawn product gas.

6. A method according to claim 1, wherein the heating of the blast process gas at each level is achieved by heating a small flow of gas to an extremely high temperature in a plasma generator and then using this heated gas to heat the main quantity of blast process gas to the desired extent.

7. The method of claim 1, in which noncombustible products are slagged by controlling the quantity of thermal energy supplied to the blast process gas.

8. A method according to claim 1, wherein a fuel is mixed into the incoming material.

9. A method according to claim 8, wherein the thermal energy in the product gas is regulated by controlling the quantity or proportion of fuel, mixed into the incoming material.

10. A method of destroying and vaporizing household waste material in which the material is fed into the top of a shaft furnace through a feeder and descends through at least three reaction zones of increasing temperature and comprising the steps of:
(a) feeding the material concurrently with a first blast of hot process gas into the top of said furnace to predry, prevaporize and partially combust said material in a first, upper zone and produce a first product gas which flows downwardly in said furnace and leaves said first zone at a temperature of approximately 600° C.;
(b) subjecting said partially combusted material descending through the furnace to a second blast of hot process gas in a second intermediate zone to dry and vaporize said material and achieve complete break down of vaporized hydrocarbons and to produce (i) a second product gas which flows upwardly in said furnace and leaves said intermediate zone at a temperature of approximately 1200° C. and (ii) carbonized and inert materials;
(c) combining said first product gas and second product gas and removing said combined gases from said furnace at a level between said first upper zone and said second intermediate zone; and
(d) subjecting said carbonized and noncombustible material to a third blast of hot process gas in a third lower zone to combust remaining carbon and melt the noncombustible material to produce a liquid slag at a temperature of approximately 1500° C.;
and wherein each of said blasts of hot process gas supplement the heat of combustion for maintaining the reactions within the three furnace zones, and the flow rate and temperature of each of said three blasts of process gas are controlled independently by heating a predetermined quantity of said process gas in at least one plasma generator.

11. The method of claim 10, wherein in said first upper zone up to 80% of water entering said zone is vaporized; up to 30% of the volatile portion of said refuse is vaporized; up to 30% of volatile carbon is vaporized; up to 10% of bound carbon is vaporized and in said first product gas the ratio of $CO_2/CO$ at least 2:1 and the ratio of $H_2O/H_2$ is at least 3:1.

* * * * *